United States Patent

Clark et al.

[11] Patent Number: 5,615,898
[45] Date of Patent: Apr. 1, 1997

[54] BEAD SEAL MOTORCYCLE GASKET

[76] Inventors: James M. Clark, 637 Bangs Ave., Modesto, Calif. 95356; Ralph E. Cholez, P.O. Box 3985, Sonora, Calif. 95370

[21] Appl. No.: 515,459

[22] Filed: Aug. 15, 1995

[51] Int. Cl.$^6$ ..................................... F16J 15/12
[52] U.S. Cl. .................. 277/235 B; 277/235 A
[58] Field of Search ............ 277/235 B, 235 A, 277/209, 210

[56] References Cited

U.S. PATENT DOCUMENTS

| | | | |
|---|---|---|---|
| 3,477,867 | 11/1969 | Hillier | 277/235 B |
| 3,794,333 | 2/1974 | Czernik et al. | 277/235 B |
| 4,140,323 | 2/1979 | Jacobs | 277/235 B |
| 4,428,593 | 1/1984 | Peralstein | 277/235 B |
| 4,625,979 | 12/1986 | Inciong | 277/235 B |
| 4,828,275 | 5/1989 | Udagawa | 277/235 B |
| 4,930,792 | 6/1990 | Gluck et al. | 277/235 B |
| 5,004,650 | 4/1991 | Ashizawa et al. | 277/235 B |
| 5,322,299 | 6/1994 | Terai | 277/235 B |
| 5,340,525 | 8/1994 | Czernik . | |

FOREIGN PATENT DOCUMENTS 280645  10/1993  Japan ................... 277/235 B

*Primary Examiner*—Scott Cummings
*Attorney, Agent, or Firm*—Mark D. Miller

[57] ABSTRACT

A highly reliable, versatile and long lasting motorcycle gasket made of a special rubber-covered metal having dual raised silicone beads around the perimeter on both the front and back surfaces of the gasket. The raised silicone beads are provided around the perimeter of both the inner bore and the outer edge of the gasket to provide a double seal. Mirror-images of these same raised beads are provided on both the front and rear surfaces of the gasket further improving its sealing characteristics. A broad silicone layer is provided on both surfaces of the gasket in areas which correspond to known gaps in the metal parts of the engine with which the gasket is to be used.

7 Claims, 3 Drawing Sheets

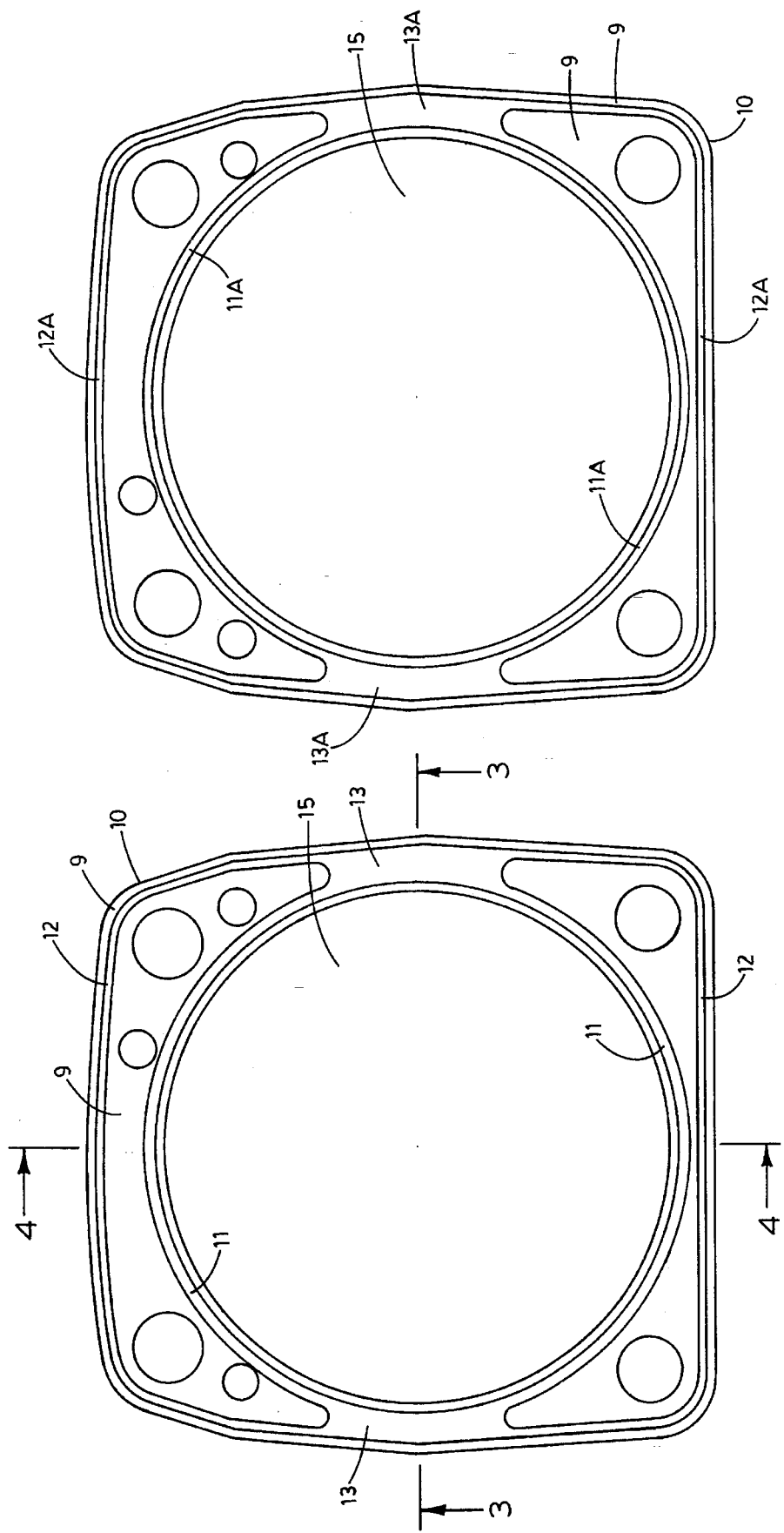

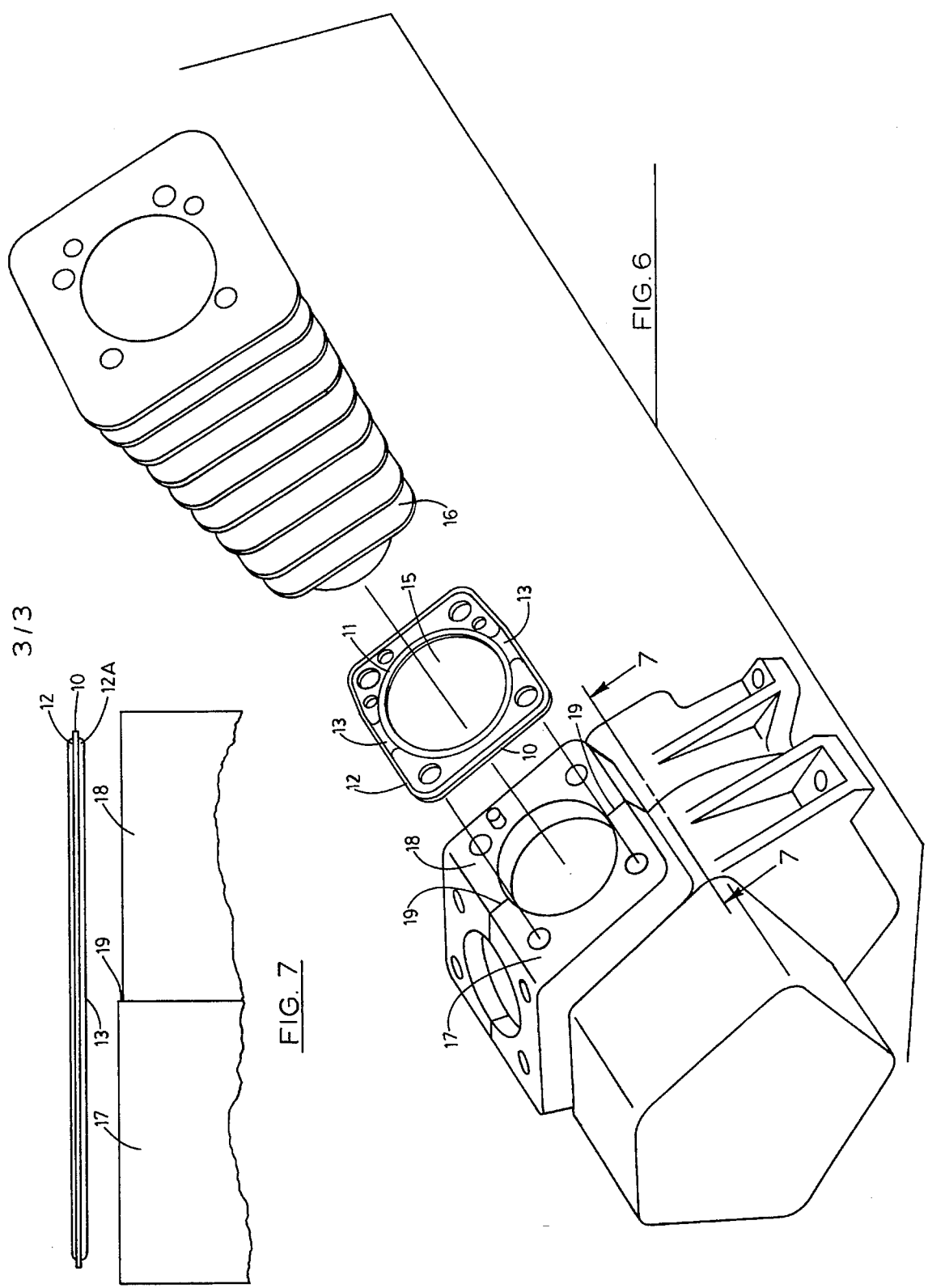

BEAD SEAL MOTORCYCLE GASKET

BACKGROUND OF THE INVENTION

1. Field of the Invention.

The present invention relates to gaskets, and in particular to a motorcycle engine cylinder base gasket having a perimeter bead seal.

2. Description of the Prior Art

Internal combustion engines of various kinds are well known in the art. For sealing a clearance between the surfaces to be sealed, e.g. a cylinder and a crankcase block of an internal combustion engine, various gaskets are deposited therebetween. The gasket for use on the internal combustion engine defines a plurality of openings, e.g. the bore opening and fluid (oil) openings and clamping stud holes, and is clamped between the cylinder and crankcase so that oil or other fluids will not spread from these openings.

Internal combustion engine gaskets can be made from paperboard, cork, rubber, metal or other flat material. The high temperatures and corrosive materials (such as oil and gasoline) found in an engine will cause paperboard, cork and rubber gaskets to deteriorate resulting in gaps which lead to fluid leaks.

The constant vibration of a motorcycle engine can cause paperboard, and cork gaskets to compress unevenly between the metal parts of an engine. The short-term solution to this problem is to apply more torque to the gasket by tightening the metal engine parts around it. However, such gaskets do not retain such torque so that within a relatively short period of time, the vibration of the engine will loosen the gasket, which can lead to leaks in the uneven gaps.

An oil leak in a small motorcycle engine can be particularly dangerous since the engine runs at a very high temperature and does not hold much oil in the first place. A motorcycle engine can be severely damaged and malfunction before such a leak is even detected. As a result of these factors, among others, paperboard, cork and rubber gaskets must frequently be replaced.

Metal gaskets generally do not deteriorate in the same way that paperboard, cork or rubber gaskets do. However, a metal gasket does not necessarily provide a leak-proof seal because it is not pliable in the same way that paperboard, cork and rubber gaskets are. Metal gaskets made of copper are particularly dangerous because if placed between opposing engine parts made of aluminum and iron, a chemical electrolysis takes place which may erode away the copper of the gasket. Constant replacement of gaskets is expensive and time consuming.

No two motorcycle engines are exactly alike, and each will have its own good and bad fitment characteristics. Some engine manufacturers are notorious for providing engine parts that do not fit together well. It is not at all uncommon for a motorcycle engine crankcase to have an uneven surface at the cylinder base where the two halves of the crankcase are bolted together. Similarly, the mating surface of the cylinder itself may not be uniform or flat. Other potential poor fitment situations include rocker cover gaskets, cylinder head gaskets and oil pan gaskets. In such situations, the function of a gasket becomes even more important since there may be relatively large gaps between the metal parts which must be sealed.

In particular, Harley-Davidson 1340 cc V-Twin motorcycle engines made between the years of 1984 and 1996 have machining variances of several thousandths of an inch between the crankcase halves. Harley-Davidson engine crankcases split into a left and right side rather than top and bottom halves leaving a small step at the mating surface. When the cylinder is installed onto the assembled crankcase, the uneven crankcase mating surface makes fluid sealing difficult.

SUMMARY OF THE INVENTION

The present invention overcomes the problems presented by paperboard, cork, rubber and metal gaskets by providing a metallic base plate gasket with a heat resistant elastic rubber layer bonded to it and having beads formed therearound to ensure a high sealing pressure especially around the stud, bore and fluid (oil) holes. The present invention provides a highly reliable, versatile and long lasting motorcycle gasket made of metal that is coated with a compounded nitrile rubber and having dual raised silicone beads around the perimeter on both the front and back of the gasket. Either stainless or cold rolled steel is coated with a high temperature compounded nitrile rubber film which resists fatigue and will not become brittle, extrude out, fracture or allow seepage over a wide range of temperatures.

Raised self-leveling adhesive silicone beads are provided around the perimeter of both the inner bore and the outer edge of the gasket to provide a double seal. Mirror-images of these same raised beads are provided on both the front and rear surfaces of the gasket further improving its sealing characteristics. A broad silicone layer can be provided on opposite sides of both surfaces of the gasket in areas which correspond to known gaps in the metal of the engine (e.g. where the two halves of the crankcase meet).

The silicone beads and the compounded nitrile rubber coating are impermeable to most engine fluids, including fuel and oil, and can withstand temperatures from −40 to +400 degrees Fahrenheit. The combination of the rubber coated metal and raised silicone beads provides significant torque retention since the pliable elastic characteristics of both the rubber coated surface of the gasket and the silicone beads absorb much of the engine vibration.

Because metal sheets are used as substrates, the rubber coated gasket will not allow any leakage of the internal oil under pressure. In addition, the elasticity of the rubber and silicone bead layers enables the gasket to closely fit the irregularities which may be found in the surface of the cylinder and crankcase and thereby insures reliable sealing properties.

It is therefore a primary object of the present invention to provide a long lasting rubber-coated flat metallic gasket for a motorcycle engine having a raised silicone bead around the perimeter of both surfaces.

It is a further important object of the present invention to provide a long lasting rubber-coated metallic gasket for a motorcycle engine having raised silicone beads around both the bore and perimeter of both surfaces.

It is a further important object of the present invention to provide long lasting rubber-coated metallic motorcycle engine gasket having dual silicone beads on both surfaces which can withstand a temperature range of −40 to +400 degrees Fahrenheit.

It is a further important object of the present invention to provide long lasting rubber-coated metallic dual bead seal high temperature motorcycle engine gasket that provides high torque retention and has good sound deadening characteristics.

It is a further important object of the present invention to provide long lasting rubber-coated metallic dual bead seal high temperature torque retentive sound deadening motorcycle engine gasket having a broad silicone layer positioned to fill gaps in the metal structure of the motorcycle engine for which it is used.

Additional objects of the invention will be apparent from the detailed descriptions and the claims herein.

BRIEF DESCRIPTION OF THE DRAWINGS

FIG. 1 is a top plan view of the bead seal gasket of the present invention.

FIG. 2 is a bottom plan view of the present invention.

FIG. 6 is a perspective exploded view showing the placement of the present invention between a motorcycle engine crankcase and a cylinder barrel.

FIG. 7 is a close up side view of the crankcase showing its two halves and the potentially uneven upper surface that is covered by the gasket of the present invention.

DETAILED DESCRIPTION OF THE DRAWINGS

Figure 3:
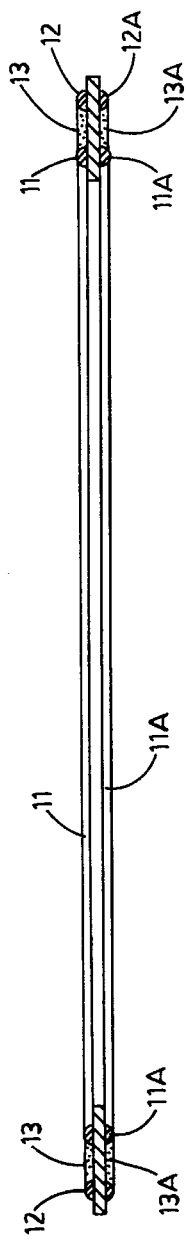
FIG. 3 is a cross-sectional cutaway side view along line 3—3 of FIG. 1.
Figure 4:
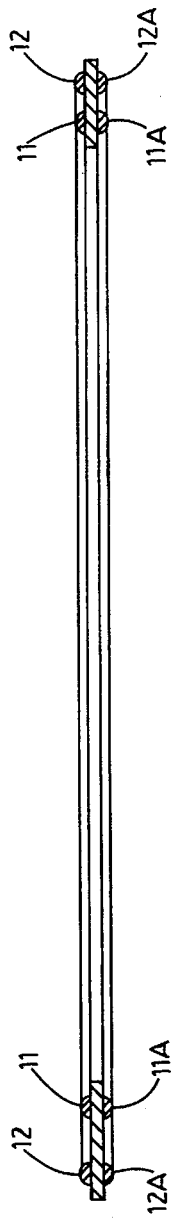
FIG. 4 is a cross-sectional cutaway side view along line 4—4 of FIG. 1.

Referring to the drawings wherein like reference characters designate like or corresponding parts throughout the several views, and referring particularly to FIG. 1 it is seen that the invention includes a flat annular gasket blank 10 having a large central bore 15 through which a piston of an engine (not shown) may pass. Gasket blank 10 is coated on the top and bottom by a compounded nitrile rubber. A clear silicone adhesive 21 may be used to seal the exposed metal edges of blank 10 (see FIG. 5).

An inner closed annular raised silicone bead 11 is provided on the top surface of blank 10 around the edge of the entire inside perimeter defined by bore 15. A corresponding inner closed annular raised silicone bead 11a is also provided on the bottom surface of blank 10 around the perimeter of the inside edge defined by bore 15. An outside closed annular raised silicone bead 12 is provided on the top surface of blank 10 around the entire outside edge; and a corresponding outside closed annular raised silicone bead 12a is provided around the entire outside edge of the bottom surface of blank 10. One or more areas of thick silicone 13 may also be provided on the top surface (with corresponding areas 13a on the bottom surface) of blank 10, between inner bead 11 and outer bead 12 (or 11a and 12a). Areas 13 and 13a may be provided at any point between inner beads 11, 11a and outer beads 12, 12a where necessary to close expected gaps 19 in the metal parts 17, 18 sealed by gasket blank 10 (see FIG. 7).

Figure 5:
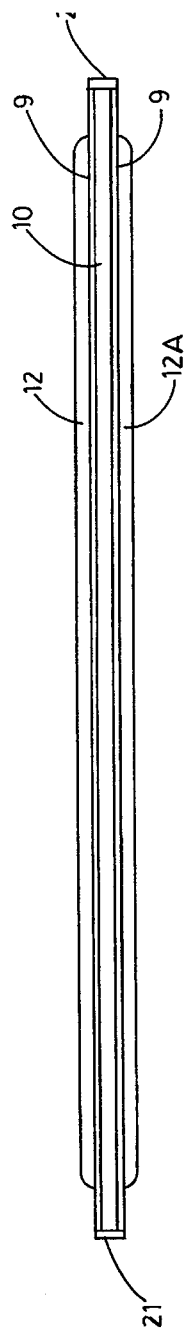
FIG. 5 is a detailed side view of the gasket of the present invention showing the central metal strip, the rubber coating, the raised silicone beads, and the clear silicone end seals.

The detailed and exaggerated cross sectional view of FIG. 5 shows the central metal strip of blank 10, the rubber coating 9 on the top and bottom, and the raised silicone beads 12, 12a on the top and bottom of the coating.

FIG. 7 shows the two halves 17, 18 of the engine crankcase and the gap 19 therebetween. Gasket 10 is fitted between the crankcase and the cylinder barrel 16 as shown in FIG. 6. Areas 13 and 13a correspond to the gaps such as gap 19 in order to provide a tight and secure seal.

DESCRIPTION OF THE PREFERRED EMBODIMENTS

In the preferred embodiment, the flat blank 10 of the present invention is made of sturdy metal such as stainless or cold rolled steel, and is covered by a film 9 made of a nitrile rubber compound. The raised beads 11, 12 and thickened areas 13 on the front and back surfaces should be made of a self-leveling adhesive silicone or other rubberized material that is both flexible and resistant to high temperatures. The material of the raised beads and area 13 should have a shore A durometer hardness of between 25 and 75, with a preferred hardness of approximately 45. The edge seals 21 may be made of a suitable clear silicone adhesive that is resistant to high temperatures in order to prevent outside moisture or the like from reaching the metal of blank 10.

Silicone beading on the flat rubber-coated gasket affords high unit sealing pressure and a large degree of conformability due to rubber like qualities. Beads on either side can measure between two thousandths of an inch (0.002") and ten thousandths of an inch (0.010") above the flat rubber layer. In those regions where extra silicone is deemed necessary (e.g. to close the gap caused by uneven matching of the halves of an engine crankcase), a thicker silicone bead should be employed, depending upon the expected size of the gap to be filled.

Without the silicone beads, the thickness of the rubber coated metal may range from eight thousandths of an inch (0.008") to forty-five thousandths of an inch (0.045") depending upon the desires of the user. The silicone beads on either side of the gasket range in height from two thousandths of an inch (0.002") to then thousandths of an inch (0.010") each. Thus, the total thickness of the gasket, including the beads on both sides, may range from twelve thousandths of an inch (0.012") to sixty-five thousandths of an inch (0.065"). In high performance motorcycle engine cylinder base applications, a thinner gasket is used in order to improve compression. The thinner gasket increases compression (and power) in the engine since the piston moving inside the cylinder is able to come up higher. Thicker gaskets reduce the height that the piston comes up, thereby reducing compression and power. Since motorcycle engine gaskets have spacer characteristics, it is important that different variations in thickness be available.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

We claim:

1. A motorcycle engine gasket comprising a flat metallic blank that fits between the engine crankcase and the cylinder barrel of a Harley-Davidson motorcycle, said blank having a layer of rubber coating on the top and bottom surfaces thereof, a large central bore therethrough, a first raised annular rubberized bead on said top surface surrounding said bore, and a corresponding second raised annular rubberized bead on said bottom surface, said first and second beads being provided around the outer perimeter of said blank; a third and fourth raised annular bead provided, respectively and correspondingly, on the top and bottom surfaces of said blank around the perimeter of the inner bore; and a broad raised rubberized area provided on both the top and bottom surfaces of said blank between said raised beads, said area corresponding to potential irregularities where the surfaces of the two attached halves of said Harley-Davidson engine crankcase come together.

2. The gasket described in claim 1 wherein a plurality of openings are provided in said blank between the raised beads for receiving the parts of a Harley-Davidson motorcycle engine.

3. The gasket described in claim 1 wherein the entire metallic blank is sealed using a rubberized material.

4. The gasket described in claim 3 wherein said rubberized material is a self-leveling adhesive silicone having a shore A durometer hardness of between 25 and 75.

5. The gasket described in claim 3 wherein said blank coating is comprised of a compounded nitrile rubber.

6. The gasket described in claim 1 wherein said raised beads measure between two thousandths of an inch (0.002") and four thousandths of an inch (0.004") above the flat layer of rubber coating.

7. The gasket described in claim 3 wherein the thickness of the metallic blank and the layers of rubber coating on the top and bottom measures between eight thousandths of an inch (0.008") and forty-five thousandths of an inch (0.045").

* * * * *